United States Patent Office 3,629,370
Patented Dec. 21, 1971

3,629,370
PROCESS FOR THE PRODUCTION OF THERMO-
PLASTIC-ELASTIC MOULDING COMPOSITIONS
OF HIGH IMPACT AND NOTCHED IMPACT
STRENGTH
Karl-Heinz Ott, Leverkusen, Herbert Schuster, Cologne-
Stammheim, Karl Dinges, Odenthal, and Harry Rohr,
Cologne, Germany, assignors to Farbenfabriken Bayer
Aktiengesellschaft, Leverkusen, Germany
No Drawing. Filed Sept. 13, 1968, Ser. No. 759,801
Claims priority, application Germany, Oct. 4, 1967,
F 53,670
Int. Cl. C08f 1/76, 15/04
U.S. Cl. 260—880            4 Claims

ABSTRACT OF THE DISCLOSURE

Graft copolymers of a diene polymer as a base and a styrene type and an acrylonitrile type monomer are produced with a water-soluble, aliphatic azo-compound as a catalyst.

---

This invention relates to a process for the production of high-impact thermoplastic-elastic moulding compositions based on copolymer or graft polymer mixtures of polymers of acrylonitrile, butadiene, styrene and methyl methacrylate. More particularly, the present invention relates to a process for the production of thermoplastic-elastic moulding compositions based on copolymer or graft polymer mixtures of polymers of acrylonitrile, butadiene and styrene (ABS-polymers).

High-impact thermoplastic moulding compositions of this kind can be obtained by combining polymers which, on their own, are hard and brittle, for example polystyrene or copolymers of styrene with acrylonitrile, with polymers which, on their own, are soft and more or less rubber-like, for example butadiene-styrene, or butadiene-acrylonitrile copolymers.

In order to improve the compatibility of the components of the polymer combination, the resin-like components (for example styrene-acrylonitrile) have already been graft-polymerised in the presence of a previously polymerised rubber-like component (for example butadiene-homo or copolymer). These graft copolymers can be resin-like, thermoplastic or rubber-like and elastic in character, depending upon the ratios in which the components are used. Accordingly, these products are in themselves thermoplastic moulding compositions. However, they may also be mixed with individually prepared thermoplastic polymers, for example styrene-acrylonitrile copolymers.

The technological properties of graft copolymers of this kind are governed not only by the type of monomers and polymers used and by the quantity in which they are used, but also by the method used for their preparation.

There are numerous known processes for producing graft polymers in aqueous emulsion by polymerising styrene or styrene and acrylonitrile (or even other monomers) in a latex of a butadiene polymer. In all these processes, the graft polymerisation reaction is initiated by means of an activator or an activator system although no allowance has been made for the substantial influence which activation has upon the mechanical data of graft copolymers of this kind.

As a rule, inorganic peroxidic compounds such as potassium or ammonium peroxydisulphate, or organic peroxides such as benzoyl peroxide or cumene hydroperoxide, are used in the preparation of these graft polymers. So-called Redox systems have also been used. These are a combination of the above-mentioned inorganic or organic peroxidic compounds with inorganic or organic reducing agents, for example sodium pyrosulphite, sodium formaldehyde sulphoxylate or dextrose. Whereas when the inorganic peroxidic compounds or the afore-mentioned Redox systems are used, products of average to good impact strength are obtained, the use of organic peroxidic compounds for graft polymerisation in aqueous emulsion is accompanied by the precipitation of polymer in large quantities, i.e. by coagulate formation. For this reason, activator systems such as these cannot be used in practice.

A second class of initiators, namely aliphatic azo compounds, has been used to initiate the radical homopolymerisation or copolymerisation of monomers containing vinyl or vinylidene groups. The most typical representative of this class of initiators is azodiisobutyronitrile which is also commercially used on a large scale.

When radical formers of this kind are used, the polymerisation reaction is not affected by secondary oxidation reactions. Accordingly, the resulting polymers are less discoloured and much more stable to light. In addition, undesirable crosslinking reactions are suppressed for the most part so that polymers prepared with the assistance of initiators such as these often show improved solubility, too. Unfortunately, one serious disadvantage of these activators is that they are soluble in organic solvents only. As a result, their use is restricted to certain polymerisation processes, for example solution or suspension polymerisation in organic solvents. What is commercially the most interesting method of polymerisation, namely polymerisation in aqueous emulsion, has to be left out because the same effects, i.e. marked coagulate formation, that characterise the use of organic peroxides, occur.

In order to obviate the disadvantage of insolubility in water, it was proposed in U.S. patent specifications Nos. 2,520,338 and 2,599,300, in regard to the homopolymerisation or copolymerisation in aqueous emulsion of monomers containing vinyl or vinylidene groups, to make these activators more readily soluble in water, for example by the incorporation of carboxyl groups or by the addition of hydrogen halide. Compared with homopolymers or copolymers produced with inorganic or organic peroxide compounds as activators, the products obtained in this way then have the same advantages as, for example, those obtained with azodiisobutyronitrile.

The following factors have generally been held by experts to stand in the way of graft polymerisations carried out in aqueous emulsion in the presence of activators based on aliphatic azo compounds and, in this particular context, the production of high impact moulding compositions based on butadiene-styrene or butadiene-styrene-acrylonitrile:

(1) Catalysts of this kind do not promote a graft reaction.

(2) Due either to the different dissociation mechanism, or to the absence of the oxidising effect, limited degrees of grafting and hence products without any technological significance are obtained from the graft reaction.

(3) In principle, the production of high impact moulding compositions such as these in aqueous emulsion in the presence of azodiisobutyronitrile as the polymerisation initiator is possible. The reaction conditions are, however, complicated by the coagulate formation that occurs, so that a process of this kind is of no interest whatever for practical application.

Accordingly, there was some degree of technical prejudice against the use of aliphatic zero compounds as activators for carrying out graft reactions in aqueous emulsion and, in this particular context, against the production of high impact moulding compositions based on butadiene-styrene or butadiene-styrene-acrylonitrile, resulting inevitably in the fact that moulding compositions of this kind were hitherto produced solely through suspension or block polymerisation.

It has now been found that thermoplastic moulding compositions showing a considerable improvement with regard to their technological properties, their impact and notched impact strengths in particular, can be obtained from:

(A) 5 to 60% by weight and preferably from 10 to 40% by weight of a butadiene polymer optionally comprising up to 30% of copolymerisable monomers, for example styrene, isoprene, acrylonitrile, or acrylic or methacrylic acid esters, with 1 to 8 carbon atoms in the alcohol moiety, and (B) 95 to 40% by weight and preferably 90 to 60% by weight of polymerised styrene or polymerised styrene and acrylonitrile in a ratio of from 95:5 to 50:50, in which case all or part of the styrene may be replaced by side-chain or nuclear-substituted styrene or even by methyl methacrylate, and the acrylonitrile may be wholly or partially replaced by methyl methacrylate or methacrylonitrile, providing water soluble activators of Formula I

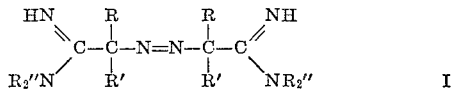

wherein R and R' each represents an alkyl radical with 1 to 4 carbon atoms and R'' represents a hydrogen atom or an alkyl radical with from 1 to 4 carbon atoms, or of Formula II

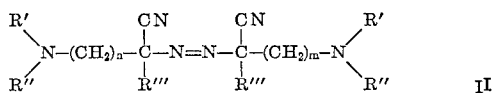

wherein R', R'' and R''' each represents an alkyl radical with from 1 to 4 carbon atoms, whilst $m$ and $n$ each represents an integer from 1 to 5, are used as the polymerisation initiators for the graft copolymerisation reaction.

The water soluble initiator of Formula III (i.e. azodiisobutyroamidine) is particularly preferred:

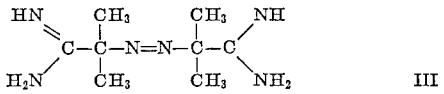

The styrene and acrylonitrile or the other monomers mentioned may be polymerised either wholly or in part in the presence of the butadiene polymer latex. The quantity of monomers polymerised in the presence of the graft base should amount to at least 20 parts by weight per 100 parts by weight of butadiene polymer, and the remaining resin component, if any, may also be added in already copolymerised form.

This discovery is completely surprising and cannot be derived from descriptions of known processes. Although these descriptions provide details of the polymerization initiators used, they ignore the significance of the polymerisation activator upon the technological properties and, in this particular context, upon the impact strength and notched impact strength of the graft copolymers.

In a preferred embodiment of the process according to the invention, high impact thermoplastic moulding compositions are prepared from:

(A) 5 to 60% by weight and preferably 10 to 40% by weight of butadiene homopolymer and (B) 95 to 40% by weight and preferably 90 to 60% by weight of a polymerised mixture of 50 to 95% by weight of styrene and 50 to 5% by weight of acrylonitrile.

The two monomers may be replaced either wholly or in part by their respective alkyl derivatives. At least 20% by weight of the total amount of polymerised styrene and acrylonitrile present are graft polymerised in the presence of the butadiene polymer, whilst the component of polybutadiene in the graft polymer should not be any greater than 80%.

In addition, blends are preferably prepared from (A) 60 to 10% by weight of a graft copolymer obtained by the procedure described above from
40 to 70% by weight of butadiene polymer and 60 to 30% by weight of a mixture of
95 to 50% by weight of styrene and
5 to 50% by weight of acrylonitrile, and (B) 40 to 90% by weight of a separately polymerised copolymer of
95 to 50% by weight of styrene and 5 to 50% by weight of acrylonitrile.

The two monomers may be replaced either wholly or in part by their respective alkyl derivatives.

Preferred butadiene polymers for the process according to the invention include homopolymers of butadiene in latex form and also copolymers of butadiene with other aliphatic conjugated diolefins with from 4 to 6 carbon atoms and with monovinyl and monovinylidene monomers. Acrylonitrile, styrene, acrylic and methacrylic acid esters and isoprene, for example, are all typical comonomers. The best results are obtained from the process when the butadiene polymer used in latex form has an average particle size of from 0.15 to 0.6$\mu$ (as measured by a Svedberg ultracentrifuge). In principle, it is also possible to replace all the butadiene by isoprene.

The butadiene polymer latex with an average latex particle size of from 0.15 to 0.6$\mu$ which is used as the graft base, is prepared by methods known in principle, for example by polymerising the monomer or monomers in aqueous emulsion. The required final particle size is also adjusted by methods known per se, for example by polymerisation in concentrated emulsion, that is to say preferably using fewer than 100 parts by weight of aqueous phase per 100 parts by weight of monomer; by the use of relatively small quantities of emulsifier; by graduating the emulsifier; or by the addition of suitable quantities of electrolyte. Those compounds of acids which, as free acids, do not have any emulsifying properties, for example salts of long-chain carboxylic acids with from 10 to 20 carbon atoms, such as oleic acid, stearic acid, dimeric oleic acid or disproportionated abietic acid, are preferably used as the emulsifiers both for the preparation of the graft base and for the graft copolymerisation reaction. In principle, however, other emulsifiers may also be used, for example salts of alkyl sulphonates and sulphates, alkyl aryl sulphonates, and reaction products of from 5 to 20 mols of ethylene oxide with 1 mol. of fatty alcohol containing from 10 to 20 carbon atoms, or 1 mol. of alkyl phenol.

Polymerisation catalysts that may be used to prepare the graft base, for example the butadiene polymer, include inorganic or organic peroxidic compounds for example water soluble persulphates such as potassium or ammonium persulphate, and organic hydroperoxides such as tert.-butyl hydroperoxide, cumene hydroperoxide, or p-menthane hydroperoxide, which are used in the quantities normally employed, e.g. 0.5 to 5% by weight, based on the total amount of monomers. In addition, it is also possible to use Redox systems comprising the aforementioned peroxidic compounds and reducing agents, in particular based upon acids containing sulphur in a low valency state, such as bisulphites, pyrosulphites, or sodium formaldehyde sulphoxylate, or organic bases such as triethanolamine.

The graft base (butadiene polymer) may be polymerised at pH-values of from 2 to 12, although a range of from 7 to 11 is preferred. Polymerisation is conveniently carried out at a temperature in the range from 20 to 100° C. and preferably in the range from 40 to 80° C.

Although polymerisation of the butadiene polymer may be stopped before a complete conversion has taken place, complete conversion of the monomers is preferred, resulting in the formation of a largely crosslinked polymer. In this instance, the gel content (i.e. toluene-insoluble component) is greater than 70%. In this instance, too, the Defo hardness of the polymers is greater than 100 and the Mooney viscosity (M1–4) greater than about 70.

Unreacted monomers, butadiene in particular, are removed by thorough stirring at reduced pressure, by bubbling nitrogen through or by distillation with steam.

Various methods may be used to produce the graft polymers. They may be characterised as follows:

(1) The butadiene polymer latex is diluted with water to such a concentration that the graft polymer latex to be prepared has a solids concentration from 20% to 50% by weight. The monomers to be grafted are emulsified into the diluted latex with stirring, optionally together with more emulsifier. After the required polymerisation temperature has been adjusted and the activator according to the invention added, the mixture is polymerised.

(2) The graft polymerisation reaction may also be carried out by continuously running the monomers into the butadiene polymer latex heated to the reaction temperature. The activator according to the invention, for example azodiisobutyroamidine, and if required more emulsifier may either be present in the butadiene polymer latex or alternatively may be added during the polymerisation reaction. In one particular embodiment of the process, the monomers are added in such a quantity that a desired monomer content is maintained in the polymerising emulsion.

(3) In another embodiment, an emulsion is initially prepared from the diluted butadiene polymer latex, optionally more of the emulsifier and the monomers, polymerisation is initiated in part of the emulsion and the remainder of the emulsion is run in during polymerisation.

According to the invention, activators of the following Formulae I or II are used to prepare the graft polymers or graft copolymers:

Formula I 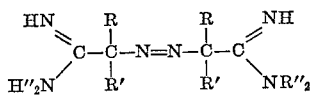

wherein R and R' each represents an alkyl radical with from 1 to 4 carbon atoms and R'' represents a hydrogen atom or an alkyl radical with from 1 to 4 carbon atoms:

Formula II 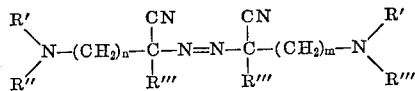

wherein R', R'' and R''' each represents an alkyl radical with from 1 to 4 carbon atoms, whilst $m$ and $n$ each represents an integer from 1 to 5.

In the case of activators corresponding to Formula I, it is also possible to replace the free base with its salts, although the pure bases are preferred. Azodiisobutyroamidine (III) is a particularly preferred initiator

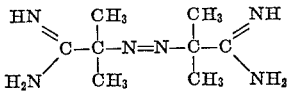 III

It is possible by using the compounds of Formulae I and II as polymerisation initiators to produce thermoplastic graft polymers and thermoplastic graft copolymers whose notched impact strength and impact strength show an improvement of up to 80% and more above those obtained with conventional systems. The initiators are soluble in water so that graft polymerisation reactions may also be carried out in aqueous emulsion on a commercial scale.

The quantity of activator required to prepare the graft polymers may vary within wide limits. For example, a quantity of from 0.1 to 5% by weight, based on the initial monomers, and preferably a quantity of from 0.1 to 2% by weight, can conveniently be used.

The reaction temperature is conveniently in the range from 25 to 100° C. and preferably in the range from 50 to 90° C.

The required amount of polymerised monomers in the end product may be polymerised in the presence of the butadiene polymer either wholly or only in part, in which later case the remainder may be added in already polymerised form. In principle, however, at least 20 parts by weight of the monomers per 100 parts by weight of butadiene polymer should be polymerised in the presence of the butadiene polymer using the aforementioned catalysts.

The monomers polymerised either wholly or in part in the presence of the diene polymer may comprise pure styrene or, in a preferred embodiment, of a monomer mixture of 95 to 50% by weight of styrene and 5 to 50% by weight of acrylonitrile. In this instance, the styrene may be wholly or partially replaced by nuclear- or side-chain-substituted styrenes or by methyl methacrylate, and the acrylonitrile may be replaced wholly or partially by methacrylonitrile or again by methyl methacrylate.

In principle, there are no limits to the choice of the emulsifier to be used in the graft polymerisation reaction. Alkali metal or ammonium salts of monocarboxylic acids containing from 10 to 20 carbon atoms, of dimerised or trimerised fatty acids, of disproportionated or hydrogenated abietic acid, of alkyl sulphonic acids or of alkyl aryl sulphonic acids with from 10 to 20 carbon atoms and of alkyl sulphates with from 10 to 20 carbon atoms, may be used. Reaction products of alkyl phenols or aliphatic alcohols having from 10 to 20 carbon atoms with ethylene oxide, and their sulphation products, may also be used either individually or in combination with other emulsifiers. The choice of the emulsifier is governed solely by the pH-value at which polymerisation has to be carried out, and by the coagulation conditions subsequently to be applied.

The graft reaction may also be carried out in the absence of additional emulsifier, providing the emulsifying effect of the emulsifier present in the butadiene polymer latex is sufficient. However, the stability of the resulting graft polymer latex is lower in this instance. As a rule, the quantities of emulsifier used are from 0 to 10% by weight and preferably up to 5% by weight based on the graft polymer.

The pH-range to be maintained is governed by the emulsifier used and by the monomers. In principle, polymerisation may be carried out at pH-values in the range from 2 to 12. When emulsifiers without any emulsifying properties in the acid range are used, polymerisation is preferably carried out at pH-values in the range from 7 to 11. If the monomer mixture contains readily hydrolysed monomers such as methyl methacrylate, polymerisation may be carried out at pH-values of around 7 and below.

In order to regulate molecular weight, that is to say the chain length of the components grafted on to the butadiene polymer, the usual regulators, for example dodecyl mercaptan may be added in quantities of up to 2% by weight, based on the polymer.

When only a portion of the required monomers are polymerised in the presence of the butadiene polymer latex, the remainder may be individually polymerised by methods and under conditions similar to those used to prepare the graft polymers themselves. The composition of the monomer mixture of the individually polymerised component may be identical to or different from the monomer mixture polymerised in the presence of the butadiene polymer latex.

The graft polymer may be mixed with the separately polymerised monomer component in latex form or in solid form, for instance on mixing rolls, in single or multi-screw extruders and in Banbury mixers.

The composition of the graft polymers or graft copolymers is ultimately governed by the properties required of the end product. A butadiene polymer content of around 5% by weight is the lower limit at which the elasticising effect of the rubber is noticeable. The product is extremely hard. The notched impact strength increases, whilst hardness decreases, with increasing butadiene polymer content. Above approximately 60% by weight of butadiene polymer, the product can no longer be effectively thermoplastically processed.

Independently of the butadiene polymer content, the graft polymers and graft copolymers prepared in the presence of the activators of Formulae I and II have a much higher notched impact strength than those obtained with the assistance of conventional polymerisation activators.

The polymers can be recovered from the graft polymer latices or latex mixtures by coagulation with dilute acids, for example acetic acid or hydrochloric acid, by the addition of electrolytes such as sodium chloride, calcium chloride, magnesium sulphate or aluminium sulphate, by evaporation or by freezing. The product obtained after separation by filtration or centrifuging, washing and drying can be compacted on mixing rolls, kneaders, internal mixers or similar machines at temperatures in the range from approximately 140 to 220° C., and granulated in the usual way. Dyes, pigments, lubricants, plasticisers and other additives may be added either before or during this operation.

The products obtained by the process according to the invention may be moulded into a variety of articles by the methods normally used for thermoplastic moulding compositions. Thus, the granulate may be injection moulded. Profiles, sheeting and tubing can be produced by means of screw extruders. The sheeting may be further processed, for example by vacuum or pressure forming, into housings, containers, shells and other forms.

The process according to the invention is illustrated by the following examples. The parts and percentages mentioned are parts and percentages by weight unless otherwise indicated.

EXAMPLE 1

1332 g. of a 56.3% polybutadiene latex containing 750 parts of polybutadiene are diluted with 2024 g. of desalted water in a glass reaction vessel equipped with stirring mechanism, thermometer and two dropping funnels. The polybutadiene latex used has an average particle diameter of $0.3\mu$ (the particle size data are based on measurement with an ultra centrifuge by Svedberg's method described in Svedberg and Pedersen "Die Ultrazentrifuge," Verlag Steinkopf 1940, pages 249 and 300). After the air has been displaced by nitrogen, the reaction mixture is heated to 65° C. and, after this temperature has been reached, a solution of 7.5 g. of azodiisobutyroamidine in 200 g. of desalted water is added to the diluted polybutadiene latex.

(a) a monomer mixture comprising 540 g. of styrene and 210 g. of acrylonitrile, and
(b) an emulsifier solution comprising 375 g. of desalted water, 42.8 g. of the sodium salt of disproportionated abietic acid and 22.5 g. of normal sodium hydroxide are then run in at a steady rate over a period of 4 hours. The reaction temperature is kept at 65° C. by external cooling. After the monomers have been added, the mixture is stirred for another 3 hours at 65° C. in order to complete polymerisation.

3380 g. of the resulting 32.13% graft polymer latex are mixed with 4820 g. of a 41.8% copolymer latex prepared by the emulsion polymerisation of styrene and acrylonitrile in a weight ratio of 70:30 (K-value 60, intrinsic viscosity 0.65) [the weight ratio of graft polymer to resin is then 35:65] and, following the addition of 15.5 g. of an anti-ager, for example 2,6-di-tert.-butyl-p-cresol, the resulting mixture is coagulated by the addition of an equal volume of 2% acetic acid, followed by heating at 90° C. The coagulate is filtered off, washed and dried. The fine-grained polymer is consolidated on mixing rolls at 170° C. to form a sheet which is then granulated. Standard small test specimens are then injection moulded from the granulate, their physical properties being set out in Table 1 under column 1.

COMPARISON EXAMPLE A

A graft polymer is prepared as described in Example 1 except that 7.5 g. of potassium persulphate is used as the activator. In other respects the procedure is as described in Example 1.

The properties of the graft polymer mixture are set out in Table 1 in column A.

COMPARISON EXAMPLE B

A graft polymer is prepared as in Example 1 except that 7.5 g. of azodiisobutyronitrile is used as the activator in a quantity of 7.5 g. The graft polymerisation reaction is accompanied by coagulate formation which, after drying, makes up 4.15%, based on the mixture as a whole. The resulting graft polymer latex is further processed in the same way as described in Example 1. The properties of the graft polymer mixture are set out in Table 1 in column B.

TABLE 1

| Example | 1 | A | B |
|---|---|---|---|
| Weight ratio of graft polymer to resin component | 35:65 | 35:65 | 35:65 |
| Polybutadiene content of the end product, percent | 17.5 | 17.5 | 17.5 |
| Activator: | | | |
| Azodiisobutyroamidine | 0.5 | | |
| Potassium persulphate | | 0.5 | |
| Azodiisobutyronitrile | | | 0.5 |
| Notched impact strength in kp. cm./cm.²: a | | | |
| 20° C | 19.7 | 13.0 | 16.0 |
| −20° C | 16.7 | 9.5 | 6.3 |
| Impact strength, kp.cm./cm.²: a | | | |
| 20° C | n.b. | (5)¹ 102.5 | n.b. |
| −40° C | (3)¹ 106.00 | 96.3 | 82.9 |
| Ball indentation hardness, kp./cm.², 60″ b | 830 | 840 | 750 |

¹ Number of broken test specimens out of the 10 used.
a DIN 53543.   b DIN 53456.

EXAMPLE 2

This example demonstrates the preparation and properties of a graft polymer for the production of which all the styrene and acrylonitrile are polymerised in the presence of the polybutadiene latex.

Similarly to the procedure described in Example 1, 453 g. of a 58.0% polybutadiene latex with an average particle diameter of $0.3\mu$ are diluted with 2333 g. of salt-free water. After the air has been displaced with nitrogen, the mixture is heated to 65° C. an then has added to it an activator solution comprising 200 g. of salt-free water and 7.5 g. of azodiisobutyroamidine.

(a) A mixture of 891 g. of styrene, 346.5 g. of acrylonitrile and 4.5 g. of tert.-dodecyl mercaptan, and (b) an emulsifier solution comprising 375 g. of Lewatit-treated water, 42.8 g. of sodium salt of disproportionated abietic acid and 22.5 g. of normal sodium hydroxide are then uniformly run in over a period of 4 hours through two dropping funnels. On completion of the addition, the mixture is stirred for 3 hours at 65° C. after which polymerisation is almost over. The resulting 32.5% graft polymer latex is coagulated by the addition of an equal volume of 2% acetic acid, followed by heating at 80° C. The polymer is further processed and tested as described in Example 1. The results obtained are set out in column 2 of Table 2.

COMPARISON EXAMPLE C

If the azodiisobutyroamidine used in Example 2 is replaced by an equivalent quantity of potassium persulphate and if in other respects the procedure is as described in Example 1 and Example 2, a moulding composition is obtained whose properties are set out in column C of Table 2.

EXAMPLE 3

This example demonstrates the preparation and properties of a graft polymer in which methyl methacrylate in addition to styrene an acrylonitrile is grafted onto the polybutadiene used as the graft base. All the graft monomers are polymerised in the presence of the graft base.

Similarly to the procedure described in Example 1, 456.5 g. of a 57.5% polybutadiene latex with an average particle size of $0.35\mu$ (the solids content amounts to 263.5 g.) are diluted with 2230 g. of salt-free water. After the air has been displaced by nitrogen and a reaction temperature of 65° C. has been adjusted, 15.0 g. of azodiisobutyroamidine are added to the reaction mixture.

(a) a mixture of 534.0 g. of styrene, 207 g. of acrylonitrile, 495 g. of methyl methacrylate and 4.5 g. of tert.-dodecyl mercaptan, and (b) an emulsifier solution of 375 g. of salt-free water, 45 g. of the sodium salt of a paraffin sulphonic acid with 12 to 18 carbon atoms and 1.5 g. of sodium pyrophosphate, are then uniformly run in over a period of 4 hours through two dropping funnels. On completion of the addition, the reaction mixture is stirred for 3 hours at 65° C. The graft polymer latex, most of which has been polymerised to completion, is coagulated by the addition of an equal volume of 2% calcium chloride solution, followed by heating at 80° C. The polymer is further processed and tested as already described. The data measured on standard small test bars are set out in column 3 of Table 2.

COMPARISON EXAMPLE D

If the azodiisobutyroamidine used in Example 3 is replaced by an equivalent quantity of potassium persulphate and if, in other respects, the procedure is the same as described in Example 3 and in Example 1, test specimens produced from this moulding composition show the technological data set out in column D of Table 2.

EXAMPLE 5

If a graft polymer latex is prepared as described in Example 1 using 7.5 g. of azodiisobutyroamidine as the polymerisation activator, and if the resulting latex is mixed with a separately prepared copolymer latex of 70 parts of a α-methyl styrene and 30 parts of acrylonitrile, K-value 61.5, in such a way that, based on 100 parts of solid polymer, 75 parts of α-methyl styrene/acrylonitrile resin are used to 25 parts of graft polymer, a moulding composition which, after further processing, shows the properties set out in colum 5 of Table 3 is obtained after coagulation with 2% magnesium sulphate solution.

TABLE 3

| Example | 4 | 5 | E |
|---|---|---|---|
| Weight ratio of graft polymer to resin component | 35:65 | 25:75 | 35:65 |
| Polybutadiene content of the end product, percent | 21 | 13.5 | 21 |
| Activator: | | | |
| Activator according to the invention | 0.5 | 0.5 | |
| Potassium persulphate | | | 0.5 |
| Notched impact strength, kp. cm./cm.²:[a] | | | |
| 20° C | 19.1 | 19.1 | 14.8 |
| −20° C | 13.6 | 8.0 | 6.2 |
| Impact strength, kp. cm./cm.²:[a] | | | |
| 20° C | n.b. | (3) 112 | n.b. |
| −40° C | n.b. | 82.1 | (8) 103.8 |
| Ball indentation hardness, kp./cm.², 60″[b] | 735 | 931 | 765 |

[a] DIN 53543.  [b] DIN 53456.

COMPARISON EXAMPLE E

Using the procedure described in Example 1, 432 g. of styrene and 168 g. of acrylonitrile are grafted on to 1552 g. of a 58.0% polybutadiene latex having an average particle size of $0.35\mu$ (=900 g. of solid polymer). 7.5 g. of potassium persulphate is used in the polymerisation activator. As described in Example 4, 3320 g. of the resulting 32.65% graft polymer latex are mixed with 4740 g. of a 42.5% copolymer latex of 70 parts of styrene and

TABLE 2

| Example | 2 | C | 3 | D |
|---|---|---|---|---|
| Weight ratio of polybutadiene to graft monomers | 17.5:82.5 | 17.5:82.5 | 17.5:82.5 | 17.5:82.5 |
| Polybutadiene content of the end product | 17.5 | 17.5 | 17.5 | 17.5 |
| Activator: | | | | |
| Azodiisobutyroamidine | 0.5 | | 1.0 | |
| Potassium persulphate | | 0.5 | | 1.0 |
| Notched impact strength in kp. cm./cm.²:[a] | | | | |
| 20° C | 19.7 | 5.7 | 18.5 | 9.9 |
| −20° C | 16.0 | 5.0 | 9.9 | 4.5 |
| Impact strength, kp. cm./cm.²:[a] | | | | |
| 20° C | n.b. | (2) 104.2 | (2) 105.4 | (8) 106.3 |
| −40° C | (6) 107.9 | 101.3 | 54.2 | 43.8 |
| Ball indentation hardness, kp./cm.², 60″[b] | 830 | 870 | 795 | 799 |

[a] DIN 53543.  [b] DIN 53456.

It is quite clear from Table 2 that the products obtained by the process according to the invention show much higher impact strength and notched impact strength and substantially the same ball indentation hardness, when compared with conventional products.

EXAMPLE 4

In a procedure identical with that described in Example 1 432 g. of styrene and 168 g. of acrylonitrile are grafted on to 1552 g. of a 58.0% polybutadiene latex having an average particle size of $0.35\mu$ (=900 g. of solid polymer). In this case, however, 7.5 g. of δ,δ′-bis-[diethylamino]-α,α′-dimethyl-α,α′-azoisovaleronitrile are used for activation.

3600 g. of the resulting 30.1% graft polymer latex are mixed with 4740 g. of a 42.5% emulsion copolymer latex of 70 parts of styrene and 30 parts of acrylonitrile (K-value 60), and the resulting mixture is worked up as in Example 1. The end product contains 21.0% of polybutadiene. This moulding composition was found to exhibit the properties set out in column 4 of Table 3.

30 parts of acrylonitrile (K-value 60), and the resulting mixture is worked up as already described. The end product contains 21% of polybutadiene. The standard small test bars produced from this moulding compound show the mechanical data set out in column D of Table 3.

EXAMPLE 6

Similarly to Example 3, a graft polymer of the following composition is prepared: 27.5% of polybutadiene, 31.3% of styrene, 12.2% of acrylonitrile and 29.0% of methyl methacrylate. In this case, too, azodiisobutyroamidine is used as the activator. The mechanical data measured on this graft polymer, following preparation of the standard small test bars, are set out in colum 6 of Table 4.

COMPARISON EXAMPLE F

Similarly to Example 3, a graft polymer of the following composition is prepared: 27.5% of polybutadiene, 31.3% of styrene, 12.2% of acrylonitrile and 29.0% of methyl methacrylate. In contrast to Example 6, activation is carried out by the addition of 2.25 parts of sodium formaldehyde sulphoxylate and 2.25 parts of cumene hydroperoxide. The properties determined on this moulding composition after it has been worked up and further processed into standard small test bars are set out in column F of Table 4.

EXAMPLE 7

Following the procedure of Example 1, a graft polymer is prepared from 540 parts of styrene, 210 parts of acrylonitrile and 750 parts of polybutadiene. In contrast to Example 1, however, 15 parts of azo-bis-isocaproic acid amidine, in the form of an aqueous solution, are used to catalyse the graft polymerisation reaction.

The resulting graft polymer latex is again mixed with a separately prepared styrene-acrylonitrile copolymer (ratio of styrene to acrylonitrile=70:30, K-value 60) in such a way that, based on 100 parts of solid polymer, 35 parts of graft polymer and 75 parts of styrene-acrylonitrile copolymer are present in the mixture as a whole. The product is worked up and further processed into standard small test bars as described in Example 1. The test specimens were found to have the properties set out in column 7 of Table 4.

TABLE 4

| Example | 6 | F | 7 |
|---|---|---|---|
| Polybutadiene content of the end product, percent | 27.5 | 27.5 | 12.5 |
| Activator: | | | |
| Activator according to the invention | 1.0 | | 1.0 |
| Cumene hydroperoxide | | 0.15 | |
| Sodium formaldehyde sulphoxylate | | 0.15 | |
| Notched impact strength, kp. cm./cm.²:ᵃ | | | |
| 20° C | 24.1 | 12.3 | 15.4 |
| −20° C | 17.9 | 8.6 | 9.3 |
| Impact strength, kp. cm./cm.², 20° C | n.b. | (4) 94.2 | n.b. |
| Ball indentation hardness, kp. cm.ᵇ, 60″ ᵇ | 650 | 638 | 735 |

ᵃ DIN 53543.  ᵇ DIN 53456.

We claim:

1. In the process of producing a graft polymer based on
   (A) 5 to 60% by weight of
      (1) a butadiene homopolymer or
      (2) a copolymer of butadiene and up to 30% by weight of styrene, acrylonitrile, acrylic or methacrylic acid esters having 1 to 8 carbon atoms in the alcohol moiety or an aliphatic conjugated diolefin having from 4 to 6 carbon atoms as grafting substrate and
   (B) 95 to 40% by weight of (a) polymerized styrene or (b) polymerized styrene and acrylonitrile in a weight ratio from 95:5 to 50:50 wherein all or part of said styrene may be replaced by side-chain or nuclear-substituted styrene or by methyl methacrylate and all or part of said acrylonitrile may be replaced by methacrylonitrile or by methyl methacrylate and wherein at least 20 parts by weight of the monomer content of (B) per 100 parts by weight of (A) are polymerized in the presence of (A), the improvement which comprises catalyzing said polymerization with a water-soluble activator of the formula

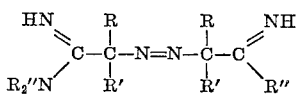

wherein R and R' are each alkyl having from 1 to 4 carbon atoms and R″ is hydrogen or alkyl having from 1 to 4 carbon atoms in a amount of from 0.1 to 5% by weight, based on total monomer reactants.

2. The process of claim 1 wherein the water-soluble polymerization initiator is azodiisobutyroamidine.

3. The process of claim 1 wherein (B) is a mixture of from 95 to 50% by weight of styrene or α-methyl styrene and 5 to 50% acrylonitrile.

4. The process of claim 1 wherein (B) is a mixture of styrene, acrylonitrile and methyl methacrylate.

References Cited

UNITED STATES PATENTS

| 2,599,299 | 6/1952 | Upson | 260—192 |
| 2,605,260 | 7/1952 | Johnson | 260—192 |
| 3,296,339 | 1/1967 | Feuer | 260—880 |
| 3,442,979 | 5/1969 | Ott et al. | 260—880 |

OTHER REFERENCES

Hammond et al., Journal of American Chemical Society, vol. 85, pp. 1501 to 1508.

JAMES A. SEIDLECK, Primary Examiner

U.S. Cl. X.R.

260—879